(No Model.) 6 Sheets—Sheet 1.

M. H. RUMPF.
EMBROIDERING MACHINE.

No. 594,653. Patented Nov. 30, 1897.

Witnesses
M. V. Bidgood
J. Green

Inventor
Martin Henri Rumpf
By Krieg & Bros
Att'ys

THE NORRIS PETERS CO., PHOTO-LITHO., WASHINGTON, D. C.

(No Model.)
M. H. RUMPF.
EMBROIDERING MACHINE.
No. 594,653.   Patented Nov. 30, 1897.
6 Sheets—Sheet 2.
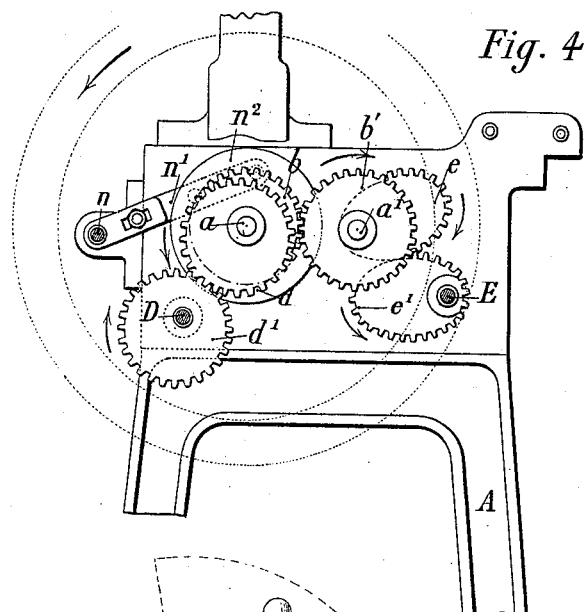
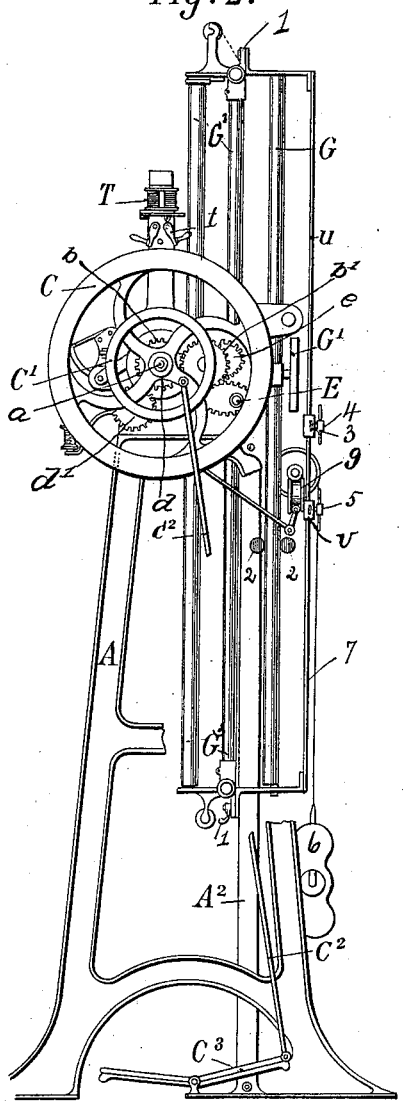
Witnesses
M. V. Bidgood
J. Green
Inventor
Martin Henri Rumpf
By Stri g W Bts
Attys (No Model.) 6 Sheets—Sheet 3.

M. H. RUMPF.
EMBROIDERING MACHINE.

No. 594,653. Patented Nov. 30, 1897.

Witnesses
M. V. Bidgood
J. Green

Inventor
Martin Henri Rumpf
By [signature]
Attys

THE NORRIS PETERS CO., PHOTO-LITHO., WASHINGTON, D. C.

(No Model.) 6 Sheets—Sheet 4.
M. H. RUMPF.
EMBROIDERING MACHINE.
No. 594,653. Patented Nov. 30, 1897.

Witnesses
M. V. Bidgood
J. Green

Inventor
Martin Henri Rumpf
By [signature]
Attys (No Model.) 6 Sheets—Sheet 5.
M. H. RUMPF.
EMBROIDERING MACHINE.

No. 594,653. Patented Nov. 30, 1897.

Witnesses
M. V. Bidgood
J. Green

Inventor
Martin Henri Rumpf
By Knight Bros
Attys (No Model.) 6 Sheets—Sheet 6.

M. H. RUMPF.
EMBROIDERING MACHINE.

No. 594,653. Patented Nov. 30, 1897.

Witnesses
M. V. Bidgood
J. Green

Inventor
Martin Henri Rumpf
By ——— Attys

United States Patent Office.

MARTIN HENRI RUMPF, OF PARIS, FRANCE.

EMBROIDERING-MACHINE.

SPECIFICATION forming part of Letters Patent No. 594,653, dated November 30, 1897.

Application filed June 4, 1895. Serial No. 551,595. (No model.)

*To all whom it may concern:*

Be it known that I, MARTIN HENRI RUMPF, manufacturer, a citizen of Brazil, residing at Paris, in the Republic of France, have invented certain new and useful Improvements in Embroidering-Machines, of which the following is a specification.

This invention relates to that class of embroidering-machines in which the needles operated mechanically act on the material held in a movable frame, which is operated by means of a pantograph.

It has for its object to provide means for obtaining a very great speed in the working of the machine and consequently a great production of useful work, to avoid the breakage of the threads, which may be the result of this high speed, and to secure all the time necessary for displacing or moving the material-holding frame.

Figure 1:
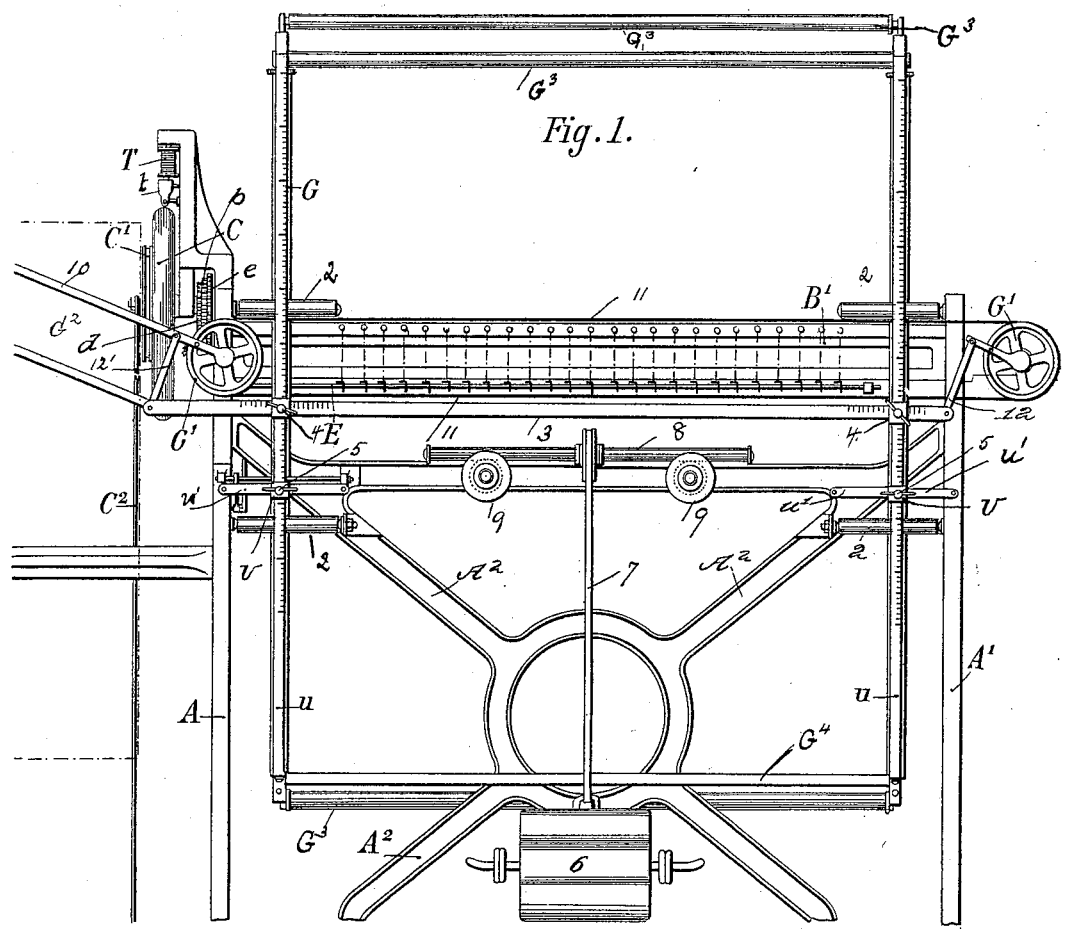
Figure 3:
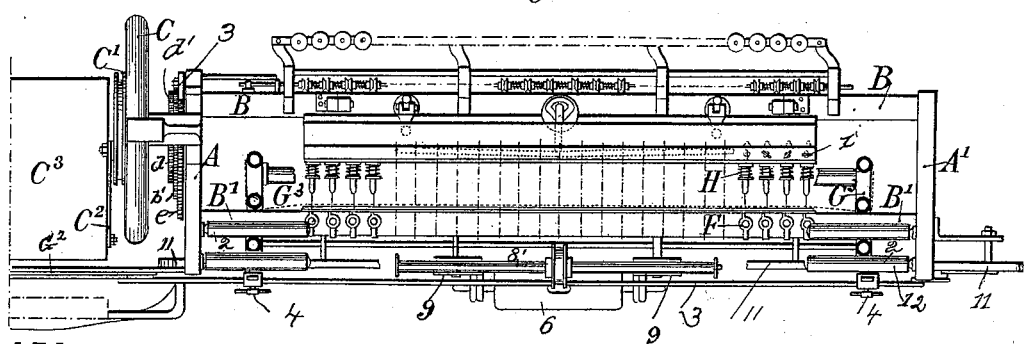
Figure 5:
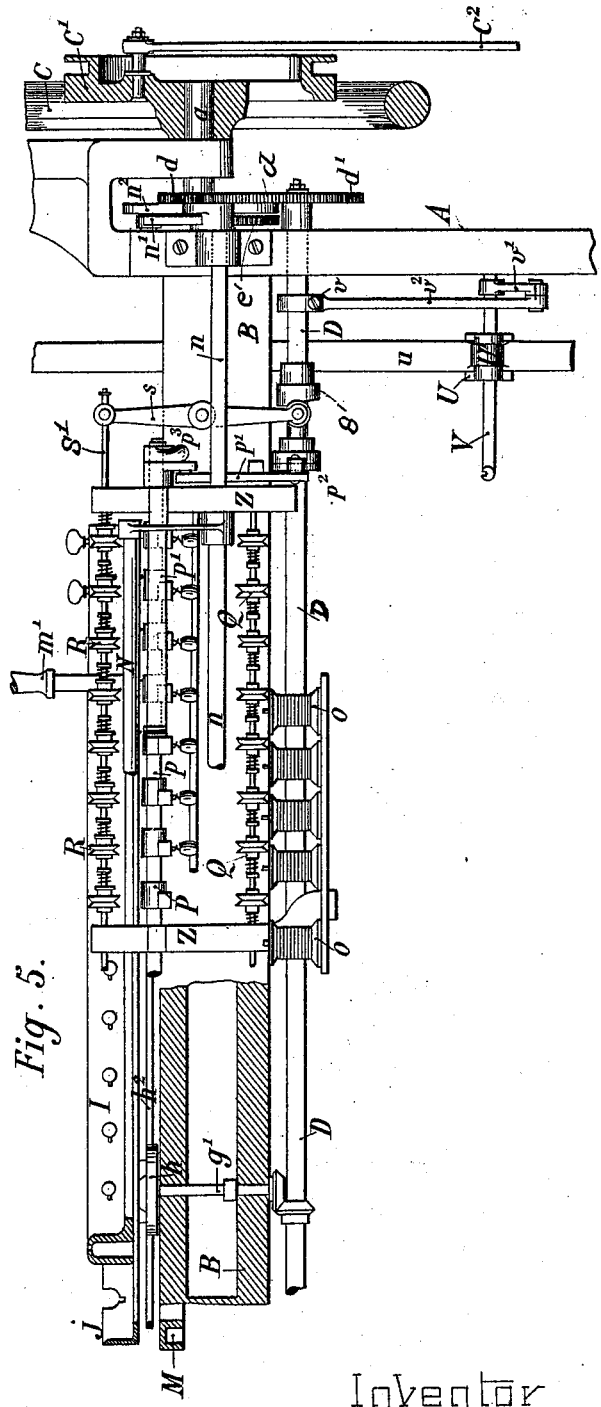
Figure 7:
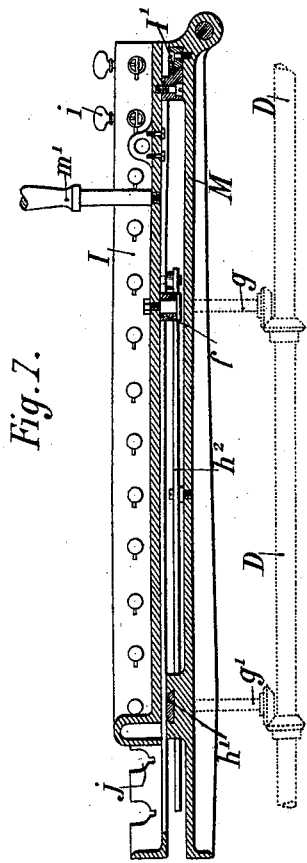
Figure 6:
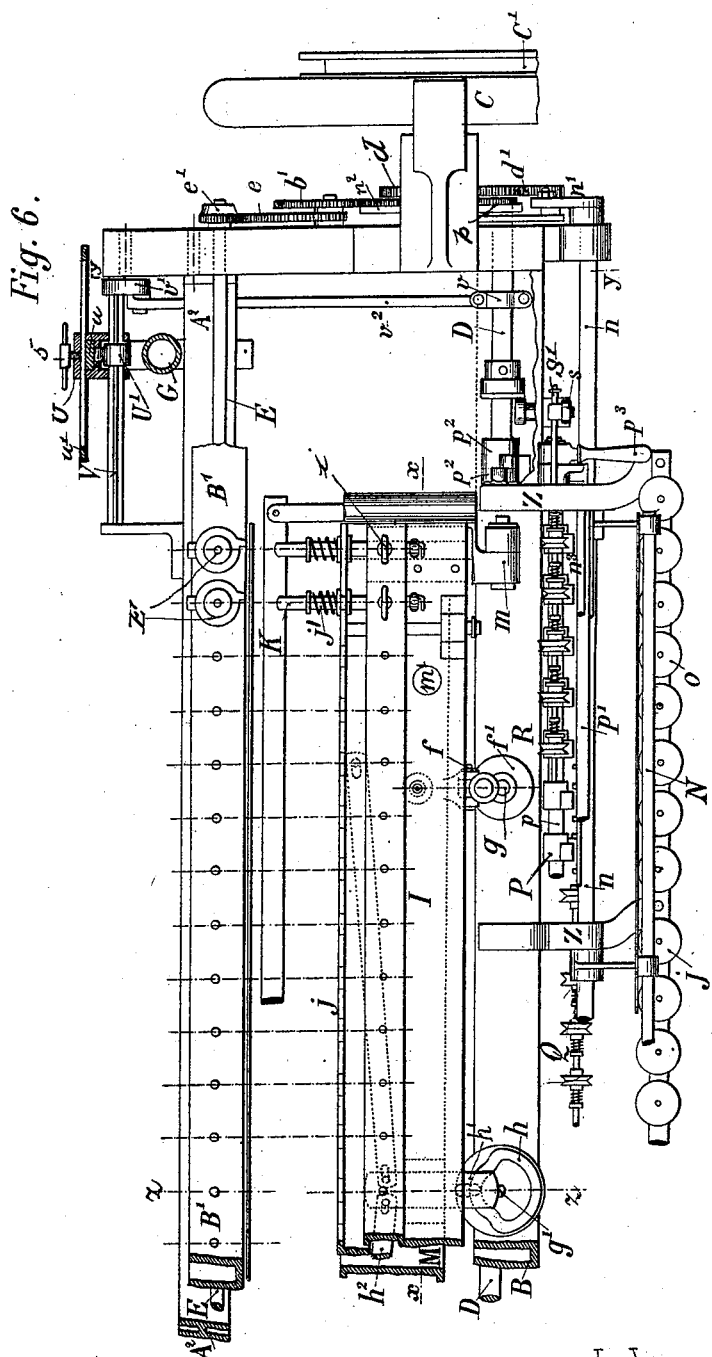
Figure 9:
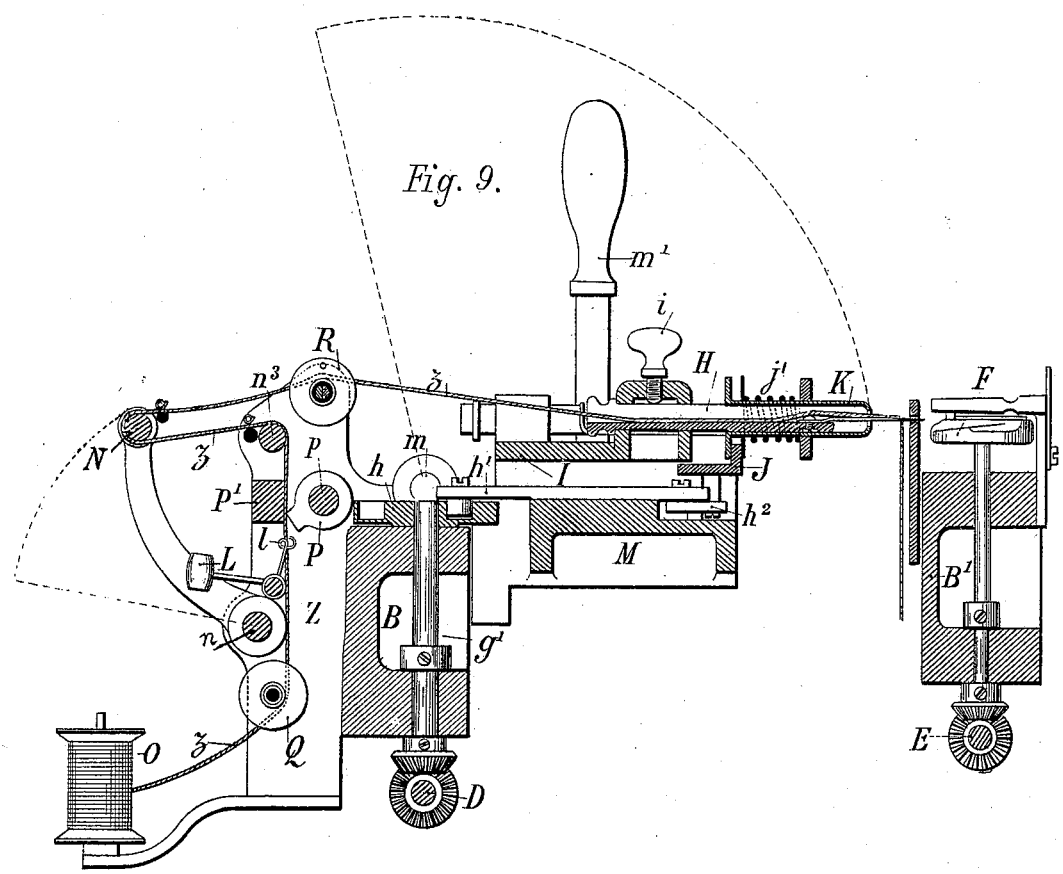
Figures 14, 15:
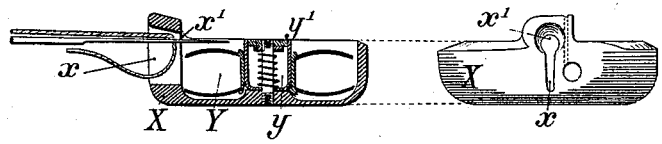
Figure 19:
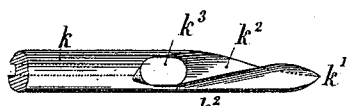
Figure 17:
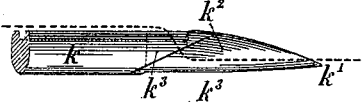
Figure 18:
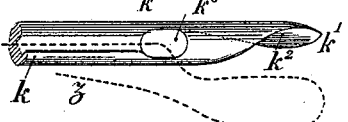
Figure 16:
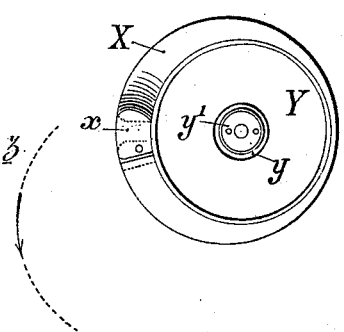
Figure 10:
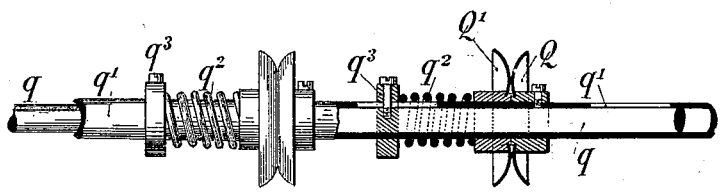
Figure 11:
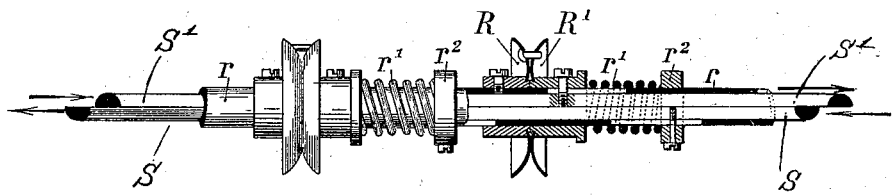
Figure 13:
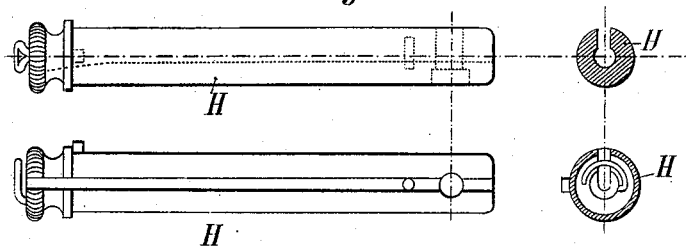
Figure 12:
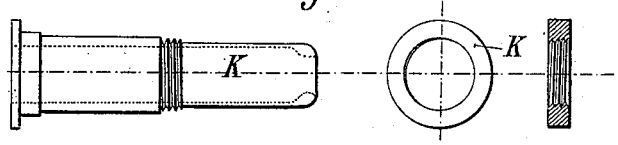

On the accompanying drawings, Figure 1 is a rear elevation of the machine. Fig. 2 is a side elevation of the same; Fig. 3, a plan view of the principal parts of the machine. Fig. 4 is a detail view of the operating mechanism. Fig. 5 is a partial elevation of the front part of the machine. Fig. 6 is a partial plan view of the machine. Fig. 7 is a section on the line $x\ x$ of Fig. 6. Fig. 8 is a section on the line $y\ y$ of Fig. 6. Fig. 9 is a section, on a larger scale, on the line $z\ z$ of Fig. 6. Fig. 10 is a view of the disks regulating the tension of the bobbin-thread. Fig. 11 is a view of the disks regulating the supply of thread to the needle. Figs. 12 and 13 are views, in full size, of the material-presser or presser-feet and of the needle-carriers. Figs. 14, 15, and 16 are views of the lock-stitch mechanism and the lock-stitch hook. Figs. 17, 18, and 19 are views of the needle on a larger scale.

As may be seen on the views of the apparatus as a whole, shown in Figs. 1, 2, and 3, all the parts are supported by a frame formed of two uprights A A′, connected by a crosspiece A² and by two bars B B′. The upright A carries the driving mechanism, which operates two main shafts, one of which, E, operates all the lock-stitch hooks F, mounted on the fixed cross-bar B′, and the other shaft, D, placed under the cross-bar B and not visible in these figures, operates the needle-carrier H and the other parts of the machine mounted on this cross-bar B.

In order to allow the working of the apparatus to be fully understood, Figs. 1, 2, and 3 show a suitable arrangement of the material-holding frame G and of the arrangement of the parallel guide G′, operated by a pantograph G².

As hereinbefore mentioned, and shown in Figs. 1, 2, and 3 of the drawings, the machine is provided with a vertical frame carrying the material, said frame being adapted for this purpose and composed of two easily-separated parts. One of the parts G³ has rollers for stretching the material and fits on the other part G by means of screws 1, in order to allow of its being removed, so that the material may be easily fitted thereon. The second part of the frame is formed of a framework, the uprights G of which are guided between rollers 2, attached to the frame. This framework is operated by a pantograph G² and parallel guiding mechanism by means of a transverse bar 3, which fits on the vertical bars $u$ of the frame by means of sliding sockets provided with thumb-screws 4. Graduations formed on the bar 3 and the bar $u$ allow the position of the frame to be easily adjusted, which may then be fixed during its operation by means of thumb-screws 5, mounted on the bars $u'$, attached to the frame.

The weight of the apparatus and of the fabric which is fitted thereon is counterbalanced by an adjustable weight 6, fixed to one of the ends of a flexible band 7, the other end of which is fixed to the cross-bar G⁴ of the framework. This band 7 passes over a pulley, the axle 8 of which rests on antifriction-rollers 9, fitted on the frame, in order that the weight 6 may exactly follow the frame in all the positions which it assumes during the work, and, finally, in order to secure the parallel guiding of the material-carrying frame in any portion during the displacements that it receives from the pantograph G², hereinbefore mentioned, the following arrangement is employed, as shown in Figs. 1, 2, and 3 of the accompanying drawings.

At the two extremities of the machine two pulleys G′, capable of revolving freely on their axles and fixed to the uprights A A′ of the frame, are arranged and are connected by a flexible band 11, which forces them to revolve together always exactly evenly. One of these pulleys carries the large arm 10 of the pantograph, to which is hinged the lever 12', forming the shorter side of the pantograph. The other pulley G' carries a little arm placed exactly parallel to the said arm 10, and on this little arm is hinged a lever 12, exactly similar in size and in direction to the shorter side of the pantograph 12', as may be seen clearly in Fig. 1. The two ends of the horizontal cross-bar 3 are flexibly connected with the ends of these two levers 12 12', on which cross-bar the frame carrying the material is attached by means of sliding sockets fixed by means of thumb-screws 4, as in the manner hereinbefore described. It is evident that in this manner the parallel guiding of the material-carrying frame is secured in any position which it may assume under the action of the pantograph $G^2$.

The mechanism for operating the machine, which is shown on a larger scale and in detail in Figs. 4, 5, and 6, is set in motion by a fly-wheel C, driven by a belt passing over a pulley C' or by a crank-rod $C^2$, connected with a treadle $C^3$. The axle $a$ of this fly-wheel carries a toothed wheel $b$, which engages with a similar spur-wheel $b'$, mounted on an intermediate spindle $a'$, which carries an elliptical wheel $e$, engaging with a similar elliptical wheel $e'$, fixed on the main shaft E, hereinbefore mentioned. In the same way the axle $a$ of the fly-wheel carries an eccentrically-mounted wheel $d$, engaging with an eccentrically-mounted wheel $d'$, fixed on the other main shaft D. The elliptical wheels $e$ $e'$ are arranged in such a way that while the fly-wheel is making one-sixth of a revolution they transmit to the shaft E, and consequently to the lock-stitch hooks F, an angular displacement equal to five-eighths of a revolution. The hook will then have passed by one-eighth the half of its rotation, and consequently the material may be displaced without inconvenience. In the same way the shaft D receives, by means of the arrangement of eccentrically-mounted wheels $d$ $d'$, a rapid rotary motion immediately after the hook has entered into the loop formed and which forces the needle to move back consequently in succession to a sufficient extent to allow the material to be displaced or shifted. In order to avoid breaking the thread, which might result from this very high speed of the hook and the inequality in length of the stitches of the embroidery, the combined pull-off and take-up device N for supplying the thread is arranged in such a way that during the forward movement of the needle it furnishes automatically more thread than is necessary for the longest stitch. In this manner the hook when seizing the loop exerts no dragging action on the thread, which is slack at this moment, and the material may be displaced without inconvenience for any length of stitch; but in order to prevent the thread supplied in excess being dragged by the needle adjustable tension-disks are interposed between the combined pull-off and take-up device N and the needle, which disks exert a slight pressure on the thread and force it to slip into the bezel or groove of the needle and which separate as soon as the needle has passed through the material, in order to leave the thread slack during the action of the hook, the displacement of the material, and backward return of the combined pull-off and take-up device.

Another frequent cause of the breakage of the thread, more particularly in the case of woolen materials and thick threads, is that the loop is not well formed and is not presented in a suitable manner to be engaged by the hook. It also frequently happens that when the material is shifted horizontally from the opposite side to the movement of the hook the point of the needle catches and injures the thread. In order to render the machine a practical one, it is necessary to avoid these drawbacks, and for this object the lock-stitch mechanism and the needle are arranged in the manner hereinafter described. Finally, with the same object a special arrangement prevents any movement of the material-carrying frame G so long as the positions of the hook and the needle do not admit of the displacement of the material.

A brake or thread-grip, intended to retain the thread while the combined pull-off and take-up device N returns and brings back the excess of thread which it has supplied, and tension-disks which serve to stretch the thread into its passage into the thread-break indicator and to press the stitch on the material are interposed between the bobbins $o$ and the combined pull-off and take-up device N. Finally, the needles are mounted on a hinged support which allows of their being raised in order to give free passage to the material-carrying frame G when it is desired to withdraw it or put it in its place.

Having thus indicated the essential characteristics of this invention, the description of the principal parts of the apparatus will now be given.

As may be seen more particularly in Figs. 5, 6, 7, 8, and 9, all the needle-carriers H are mounted on a bar or carriage I, movable in slides I', Fig. 7, arranged at the ends of a supporting-bar M, and this carriage I receives near its two extremities a reciprocating movement by means of cranks $f$, plates $f'$, and shafts $g$, operated by bevel-gearing fixed on the main shaft D, as shown in Fig. 7. The material-pressers K are mounted on another bar or carriage J, movable in front of the bar I of the needle-carriers, and the reciprocating movement of which bar J is produced by means of a grooved cam $h$, Figs. 5, 6, and 9, mounted on a shaft $g'$, operated by the shaft D. This cam $h$ causes a rod $h'$, traveling in the bar M hereinbefore indicated, to move, and this bar $h'$ operates two levers $h^2$, the extremities of which are hinged to the bar J.

The material-pressers K, Fig. 12, are arranged in the form of a tube, in which the needle-carrier H may travel and which fits in grooves or notches $j$, formed in the bar J, Fig. 7, where they are held flexibly by means of a spring $j'$, Fig. 9. Finally, the cylindrical needle-carriers H, Fig. 13, are fixed to the bar or carriage I by means of thumb-screws $i$, as shown in Fig. 9.

In order to allow the material-carrying frame G, Figs. 1, 2, and 3, to be withdrawn easily and again inserted in its place, the bar M, on which the bars I and J, carrying the needle-carriers and the material-pressers, travel, is hinged at its two extremities $m$, Figs. 6, 8, and 9, on the fixed cross-bar B and may be easily raised by means of the handle $m'$, Figs. 8 and 9. With the same object the cranks $f$ are also hinged and the cam $h$ is notched or grooved at one of its points (see Fig. 6) to allow passage to the gudgeon of the slide-piece $h'$, which engages therein.

The combined pull-off and take-up device N, Figs. 5, 6, 8, and 9, is mounted on a longitudinal shaft $n$, which receives an oscillating movement from an adjustable lever $n'$, Figs. 4 and 6, and from a grooved cam $n^2$, fixed, for instance, on the axle $a$ of the fly-wheel, Figs. 4 and 5.

As may be clearly seen in Fig. 9, the thread $z$ from the bobbin O passes into tension-disks Q and then into the thread-break detector L, and from there between a bar P' and a thread-gripper P and over a rod $n^3$, whence it arrives at the combined pull-off and take-up device N, and then passes into the disks R and finally into the needle-carrier H.

The thread-gripper, Figs. 5, 6, and 9, is composed of a series of cams mounted on a shaft $p$, operated by a lever $p'$ and a cam $p^2$, mounted on the main shaft D, said cam being formed of two parts provided with similar projections, as shown in Fig. 6, which allows the duration of the action of these projections on the lever $p'$ to be varied. The thread $z\,z$ is thus arrested and held when the projections of the cams P press it against the bar P', fixed on vertical supports Z, arranged on the cross-bar B. The shaft $p$ has, further, at its extremities a handle $p^3$, which allows it to be turned by hand in order to release the thread when necessary. As has been already hereinbefore stated, the adjustable pressure or tension disks Q serve to maintain the thread stretched on its passage into the loop $l$ of the thread-break indicator, Fig. 9, and to insure the tightening up of the stitch on the material.

As may be seen in Fig. 10, one of the disks Q is fixed on a sleeve $q'$, surrounding the shaft $q$, while the other disk Q' is pressed against the disk Q by a spring $q^2$, supported or resting against a ring $q^3$, fixed on the shaft $q$ by means of a screw which allows of the pressure exerted on the thread coming from the bobbin to be regulated.

As has been already stated, the tightening and slackening of the thread which reaches the needles must be produced at given moments. For this purpose the shaft carrying the disks R, hereinbefore mentioned, employed for this purpose is arranged in two parts, one of which, S, is held fast by the supports Z, above mentioned, while the other, S', is connected by a hinged lever $s$ with a cam $s'$, mounted on the main shaft D, Figs. 5, 6, and 8. It is clearly evident in Fig. 11 that one of the disks, R, of each group is fixed on the sleeve $r$, which incloses the two rods S S', hereinbefore mentioned, while the other disk, R', is fixed on the rod S', the pressure exerted on the thread being regulated by a spring $r'$, supported by a ring $r^2$, fixed on the rod S by means of a screw.

As shown in Fig. 9, when the thread $z\,z$ happens to break the thread-break indicator L oscillates and encounters the rod $n$ of the combined pull-off and take-up device, which causes the closing of an electric circuit passing into the electromagnet T, Figs. 1 and 2. The armature of this electromagnet T is immediately displaced and disengages the arm $t$, which in falling exerts on the periphery of the fly-wheel C a sufficiently strong pressure to immediately stop the movement of the machine.

Figs. 5, 6, and 8 show the arrangement for holding fast the material-carrying frame when the position of the needles and of the hook do not allow it to be displaced without inconvenience. In these figures, G is a tubular upright of the frame, and $u$ is a rod parallel to this upright, as shown in Figs. 1 and 2. This rod $u$ passes through a socketed support U, Fig. 8, carrying a cam U', which, according to the position which it occupies, either grips and holds fast the rod $u$ or allows it liberty of movement. The socketed support U, guided by the fixed bar $u'$, Figs. 1 and 6, is obliged to follow the horizontal movements of the frame, carrying with it the cam U', which is engaged therein, and this latter is mounted on a spindle V, Figs. 5 and 6, provided with a groove, which spindle transmits to said cam the angular oscillating movement imparted thereto by means of pivoted levers $v'\,v^2$, operated by a cam $v$, fixed on the shaft D or on any other suitable shaft of the machine.

Figs. 14, 15, and 16 show the arrangement employed for insuring the formation of the loop and for forcing it to be presented to the hook in a suitable position to allow of it being easily engaged by the same. It may be seen on these figures that the bowl X, which is held immovable in the hook F, is hollowed out eccentrically in order to receive the bobbin or cop Y, and in the thickest part of its periphery a slot $x$ is formed to allow of the passage of the needle in such a way that the loop formed is held by this slot in a suitable position to be easily engaged by the hook. Further, the upper part of the slot $x$ is inclined in such a way that its lowest point $x'$ rubs against the thread when the needle is withdrawn and forces the loop to be formed below the needle, as shown in Fig. 14. In these figures the cop or spool Y fits on a little cup $y$ with an adjustable amount of friction by means of a spring and a nut $y'$. The cup $y$ must rest on the flat central part of the bowl X. In this way it is evident that the friction at this point may be regulated or adjusted by means of the nut $y'$, which when screwed up or down presses more or less on the interposed spring which bears on the bottom of the cup.

Finally, Figs. 17, 18, and 19 show the arrangement of the needle for the purpose of preventing the point of this needle encountering and injuring the thread when the material fitted in the frame G is displaced in a horizontal direction opposed to the movement of the hook and for forcing the said thread to always pass above the needle, which insures the formation of a very regular stitch of embroidery. The bowl X, placed in the hook, does not move with the hook. It has a slot $x$, giving passage to the needle, and the lowest part $x'$ of the upper and inclined edge of this slot must rub against the thread in order to facilitate the formation of the loop. It is thus necessary that this side of the bowl should be somewhat thicker, Fig. 14, while the other parts of the edge of this bowl may be much finer in order not to uselessly increase the diameter of the bowl. It is for this sole reason that the recess of the bowl is eccentric, as shown in Fig. 16.

Fig. 17 is a side view of the needle. Fig. 18 is a view from above, and Fig. 19 a view from below, of the said needle. In these figures it is seen that the end part $k$ of the needle is provided with a curved or worm groove $k^2$, starting from the bezel or eye $k^3$ and ending above the point $k'$, which is placed at a suitable prolongation from the lower center line of the cylinder which forms the body of the needle.

As shown in Fig. 17, at the moment when the needle is withdrawn from the material the thread $z\,z$, emerging from the bezel or eye $k^3$, is slightly stretched along a line passing above the point $k'$ of the needle. In this way when the material is displaced in an opposite direction to the movement of the hook shown by the arrow, Fig. 18, the thread, guided by the curved groove $k^2$, is forced to pass above the point $k'$ without meeting it. Under these conditions the loop is always formed by the side of the needle where it can be freely caught by the hook, as shown in Fig. 18, which insures a regular formation of the embroidery stitch.

It is therefore evident that this invention consists, essentially, of a new embroidering-machine, all the parts of which have been arranged and combined with the object of obtaining a large production of useful work and avoiding loss of time, employing for this object means which will be hereinafter successively claimed and which altogether constitute the invention as a whole.

I declare that what I claim is—

1. An embroidering-machine comprising a motor-shaft, a hook-operating shaft, a needle-operating shaft, the elliptical wheels whereby the motor-shaft transmits a variable movement to the hook-operating shaft and the eccentrically-mounted wheels whereby a variable movement differing from the movement of the elliptical wheels is imparted to the needle-operating shaft; substantially as described.

2. An embroidering-machine comprising a motor-shaft, needle-carriers, a combined pull-off and take-up device, an adjustable arm $n'$ and a cam $n^2$ whereby the said device is connected with the motor-shaft, and fixed disks having means for imparting an adjustable pressure thereto and which serve for retaining the thread furnished in excess by the said device; substantially as described.

3. An embroidering-machine comprising a combined pull-off and take-up device, the tension-disks between the supply and the said device, adjustable pressers in advance of the said device, and a thread-grip located between the supply and the said device; substantially as described.

4. An embroidering-machine comprising the needle-operating shaft D, the combined pull-off and take-up device N, the needle-carrier H, the fixed and movable rods S, S', the adjustable pressure-disks R, R', operated by the rods, and the lever $s$ and cam $s'$, whereby the movable rod is operated, said cam being mounted on the needle-operating shaft; substantially as described.

5. An embroidering-machine comprising the needle-operating shaft D, the adjustable pressers R, the combined pull-off and take-up device N, a thread-grip located between the supply and the said device, the sliding carriage I, the needle-carriers H fixed in a removable manner on the said sliding carriage, rods $f$, plates $f'$ and shaft $g$, and gearing whereby the shafts are connected with the said needle-operating shaft; substantially as described.

6. An embroidering-machine comprising the needle-operating shaft D, the spring tubular material-pressers K, the sliding carriage J to which the material-pressers are secured, the sliding carriage I, the needle-carriers H located on the sliding carriage I and the levers $h^2$, the rod $h'$, the grooved cam $h$, the shaft $g'$ and the gearing whereby the shaft is connected with the needle-operating shaft; substantially as described.

7. An embroidering-machine comprising a needle-carrier carriage I having needle-carriers H, a presser-carriage J having material-pressers K, a hinged supporting-bar M, the levers $h^2$ connected with the presser-carriage, the rod $h'$ connected with the levers, the plates $f'$ connected with the needle-carriage and mechanism whereby the rod and plates are connected with the needle-operating shaft while permitting the raising of the supporting-bar; substantially as described.

8. An embroidering-machine comprising the needle-operating shaft D, the material-carrying frame G³ G having uprights $u$, the laterally-sliding socketed supports V, for the uprights, and the cams V' mounted on the sliding socketed supports adjacent to the uprights, and means whereby the needle-operating shaft is connected with the cams for rendering the frame stationary at intervals; substantially as described.

9. An embroidering-machine comprising a needle-operating shaft, a needle-carrier, a hook, and a needle having an eye, a point $k'$ which when the needle is fixed in position stands near the projection of the lower generating-line of the body of the needle and an oblique spiral groove $k^2$ running from the point where the bezel pierces the said generating-line and encircling the needle and terminating above the said point $k'$ which causes the thread coming from the eye to pass above the point of the needle when the material is displaced horizontally in an opposite direction to the movement of the hook; substantially as described.

10. An embroidering-machine comprising a hook-operating shaft, a hook, the bowl recessed eccentrically in order to reduce as much as possible its external diameter and having a slot in its thickest part, the upper part $x'$ of said slot being inclined in order to press on the thread and thus facilitate the formation of the loop when the needle describes a return movement, and the lower part of said slot being narrow and vertical in order to hold the loop in order to facilitate its being caught by the hook, and a spool located in the bowl; substantially as described.

11. An embroidering-machine comprising the pantograph, the material-carrying frame, a mechanism for parallelly guiding the frame consisting of two pulleys, a flexible band connecting the pulleys, the horizontal bar, and the parallel arms by means of which the pulleys are connected to the horizontal bar; substantially as described.

In testimony whereof I have signed my name to this specification in the presence of two subscribing witnesses.

MARTIN HENRI RUMPF.

Witnesses:
EUGÈNE DUMAL,
JACQUES CONDOMY.